US012803843B2

(12) United States Patent
Jeon et al.

(10) Patent No.: US 12,803,843 B2
(45) Date of Patent: Nov. 17, 2026

(54) MOBILE DEVICE COMMUNICATION

(71) Applicant: SAMSUNG ELECTRONICS CO., LTD., Suwon-si (KR)

(72) Inventors: Eun Sung Jeon, Suwon-si (KR); Myeongjin Kim, Suwon-si (KR); Chulho Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 18/990,919

(22) Filed: Dec. 20, 2024

(65) Prior Publication Data

US 2025/0233776 A1 Jul. 17, 2025

(30) Foreign Application Priority Data

Jan. 15, 2024 (KR) ........................ 10-2024-0006140

(51) Int. Cl.
*H04L 5/12* (2006.01)
*H04B 7/06* (2006.01)
(Continued)

(52) U.S. Cl.
CPC ....... *H04L 25/0224* (2013.01); *H04B 7/0695* (2013.01); *H04W 28/18* (2013.01); *H04W 48/16* (2013.01)

(58) Field of Classification Search
CPC ... H04L 25/0224; H04L 41/16; H04B 7/0695; H04B 7/0619; H04B 17/336;
(Continued)

(56) References Cited

U.S. PATENT DOCUMENTS 10,419,093 B2 9/2019 Wilhelmsson et al.
2012/0120839 A1* 5/2012 Liu .................... H04L 25/0204 370/252
(Continued)

FOREIGN PATENT DOCUMENTS

CN 116193504 5/2023
CN 116405070 7/2023
(Continued)

OTHER PUBLICATIONS

Aio et al., "System Level Simulation of Co-BF and Joint Tx," IEEE 802.11-22/1821r1, Nov. 12, 2022, 19 pages.
(Continued)

*Primary Examiner* — Helene E Tayong
(74) *Attorney, Agent, or Firm* — Fish & Richardson P.C.

(57) ABSTRACT

A mobile device includes an antenna that communicates a wireless signal with an access point, a transceiver that communicates a signal with the antenna, and a processor that receives a first announcement packet and a sounding packet received through the antenna and the transceiver, estimates a channel based on the sounding packet, and transmits full information about a result of the channel estimation through the transceiver and the antenna. The processor receives a second announcement packet and the sounding packet received through the antenna and the transceiver, estimates a channel based on the sounding packet, and transmits partial information selected from full information about a result of the channel estimation through the transceiver and the antenna. The second announcement packet includes selection information indicating the selected partial information, and the selection information is determined based on a machine learning module included in the access point.

20 Claims, 11 Drawing Sheets

(51) Int. Cl.
*H04L 25/02* (2006.01)
*H04W 28/18* (2009.01)
*H04W 48/16* (2009.01)

(58) Field of Classification Search
CPC ... H04W 28/18; H04W 48/16; H04W 72/542; H04W 24/08; H04W 24/10; G06N 20/00
USPC ........................................................ 375/262
See application file for complete search history.

(56) References Cited

U.S. PATENT DOCUMENTS

| | | | | |
|---|---|---|---|---|
| 2012/0314594 | A1* | 12/2012 | Mahadevappa ....... | H04W 24/10 370/252 |
| 2013/0223427 | A1* | 8/2013 | Sohn ..................... | H04W 74/06 370/338 |
| 2014/0119325 | A1 | 5/2014 | Xia et al. | |
| 2023/0145844 | A1 | 5/2023 | Kwon et al. | |
| 2023/0268969 | A1 | 8/2023 | Yu et al. | |
| 2024/0323056 | A1 | 9/2024 | Jeon et al. | |

FOREIGN PATENT DOCUMENTS

| | | |
|---|---|---|
| KR | 10-2022-0151449 | 11/2022 |
| KR | 10-2023-0067558 | 5/2023 |
| WO | WO 2023068399 | 4/2023 |

OTHER PUBLICATIONS

Choi et al., "Discussion on next generation Wi-Fi ," IEEE 802.11-22/685r0, May 9, 2022, 14 pages.
Chun et al., "A candidate feature: Multi-AP," IEEE 802.11-22/1515r0, Sep. 13, 2022, 13 pages.
Erceg et al., "Next Gen After 11be: Band and Complexity Discussion," IEEE 802.11-22/1804r0, Nov. 15, 2022, 9 pages.
Erceg et al., "UHR PAR Discussion," IEEE 802.11-22/2049r2, Dec. 16, 2022, 9 pages.
Gan et al., "Next Generation SG formation," IEEE 802.11-22/1083-00-0wng, Jul. 11, 2022, 14 pages.
Iyer et al., "WiFiRe: Medium Access Control (MAC) 9 and Physical Layer (PHY) Specifications," WiFiRe Specifications, Aug. 2006 draft, Aug. 2006, 110 pages.
Jeon et al., "Adaptive Sounding Using ML," IEEE 802.11-23/0783r0, May 8, 2023, 11 pages.
Lee et al.., "Thoughts on Beyond 802.11be, "IEEE 802.11-22/0932r0, Jul. 8, 2022, 13 pages.
Lin et al., "Discussions on CSI Feedback Reduction in UHR, " IEEE 802.11-23/0473r1, May 4, 2023, 14 pages.
Ma et al., "Dynamic sounding for multi-user MIMO in wireless LANs, " IEEE Transactions on Consumer Electronics, May 2017, 63(2):135-144.
Noh et al.., "Link Adaptation for HE WLAN," IEEE 802.11-4/1329r2, Nov. 9, 2015, 28 pages.
Porat et al., "Joint Transmission for UHR—A Refresher and New Results," IEEE 802.11-22/2188r0, Dec. 18, 2022, 15 pages.
Stanley et al., "Non-rigger based sounding process," IEEE P802.11be/D2.0, May 2022, 873 pages.
Stanley et al., "UHR Proposed PAR," IEEE Std 802.Mar. 2022, 2022, 3 pages.
Tanaka et al., "Considerations on Multi-AP Coordination," IEEE 802.11-22/1516r0, Sep. 14, 2022, 11 pages.
Yu et al., "Beamforming transmission in IEEE 802.11ac under time-varying channels," The Scientific World Journal, 2014, available online Jul. 24, 2014, vol. 2014, Article ID 920937, 11 pages.

* cited by examiner

FIG. 8

| | |
|---|---|
| Channel Information | I1, I2, I3, I4, I5, I6 |
| Environment Information | Number of MU |
| | Number of Antennas |
| | Interference |
| | Movement Speed |
| Selection Information | I4 (SU) |
| | I4, I5 (MU) |
| | SNR |
| | CQI |
| | φ |
| | φ, ψ |
| | No sounding |
| | Full information |

MOBILE DEVICE COMMUNICATION

CROSS-REFERENCE TO RELATED APPLICATION

This application claims priority under 35 U.S.C. § 119 to Korean Patent Application No. 10-2024-0006140 filed on Jan. 15, 2024, in the Korean Intellectual Property Office, the entirety of which is incorporated by reference herein.

BACKGROUND

A mobile device may perform wireless communication with an access point. The access point may establish a channel between the mobile device and the access point by forming a beam corresponding to the mobile device through beamforming.

The access point may transmit a non-data packet (NDP) for measuring a channel to the mobile device. The mobile device may estimate the channel based on the received non-data packet. The mobile device may transmit information about a result of the channel estimation to the access point. The access point may manage the channel based on the information received from the mobile device.

The operation of transmitting the non-data packet, measuring the channel, and transmitting the result information of the channel estimation may be a sounding operation. The data communication between the access point and the mobile device may be inhibited while the sounding operation is performed. For example, the sounding operation may cause a decrease in a data communication speed.

SUMMARY

Some implementations of the present disclosure reduce a degree to which a data communication speed decreases due to a sounding operation.

According to some implementations, a mobile device includes an antenna that communicates a wireless signal with an access point, a transceiver that communicates a signal with the antenna, and a processor that receives a first announcement packet and a sounding packet received through the antenna and the transceiver, estimates a channel based on the sounding packet, and transmits full information about a result of the channel estimation through the transceiver and the antenna. The processor receives a second announcement packet and the sounding packet received through the antenna and the transceiver, estimates a channel based on the sounding packet, and transmits partial information selected from full information about a result of the channel estimation through the transceiver and the antenna. The second announcement packet includes selection information indicating the selected partial information, and the selection information is determined based on a machine learning module included in the access point.

According to some implementations, a mobile device includes an antenna that communicates a wireless signal with an access point, a transceiver that communicates a signal with the antenna, and a processor that receives an announcement packet received through the antenna and the transceiver, estimates a channel based on the sounding packet, selects partial information of full information about a result of the channel estimation by executing a machine learning module based on the result of the channel estimation, and transmits the selected partial information through the transceiver and the antenna.

According to some implementations, an electronic device includes an antenna that communicates a wireless signal with a mobile device, a modem that communicates a signal with the antenna, and a processor that transmits a first announcement packet and a sounding packet through the antenna and the modem, receives a first report corresponding to the first announcement packet and the sounding packet, selects partial information of full information about a result of channel estimation based on the full information about the result of the channel estimation included in the first report, and transmits a second announcement packet including selection information indicating the partial information and the sounding packet through the antenna and the modem, and the processor selects the partial information based on a machine learning module.

BRIEF DESCRIPTION OF THE DRAWINGS

The above and other objects and features of the present disclosure will become apparent by describing in detail examples thereof with reference to the accompanying drawings.

FIG. 8 illustrates an example of channel information, environment information, and selection information.

DETAILED DESCRIPTION

Figure 1:
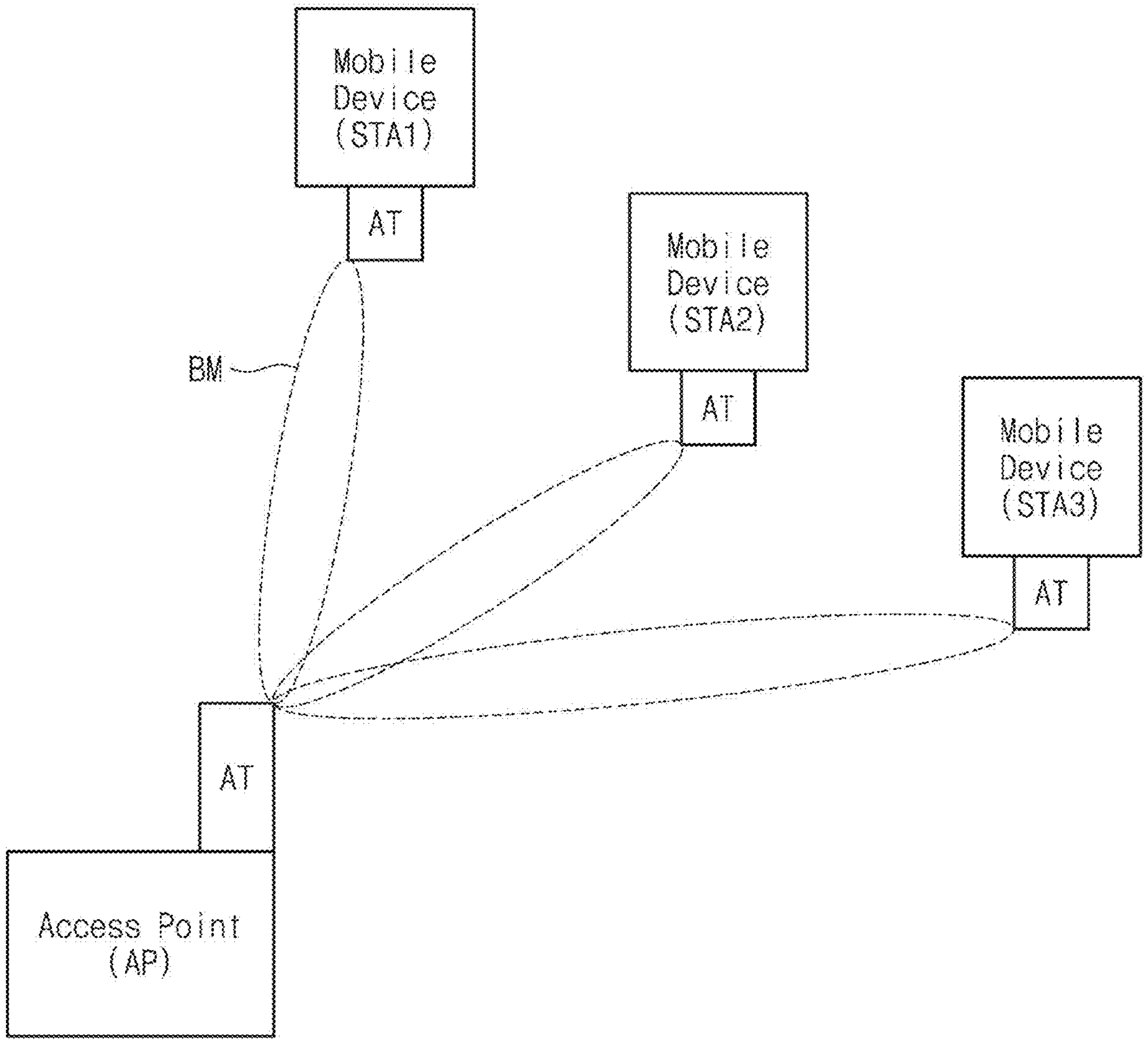
FIG. 1 is a diagram illustrating an example in which an access point, a first mobile device, a second mobile device, and a third mobile device communicate with each other.

FIG. 1 illustrates a system in which an access point AP, a first mobile device STA1, a second mobile device STA2, and a third mobile device STA3 communicate with each other. In some implementations, each of the first mobile device STA1, the second mobile device STA2, and the third mobile device STA3 may be referred to as a station.

Each of the access point AP, the first mobile device STA1, the second mobile device STA2, and the third mobile device STA3 may include an antenna AT. For example, the antenna AT of the access point AP may include a multiple-input multiple-output (MIMO) antenna. The access point AP may perform beamforming by using the antenna AT.

Through the beamforming, the access point AP may form beams BM respectively corresponding to the first mobile device STA1, the second mobile device STA2, and the third mobile device STA3. The beams BM may function as channels between the access point AP and the first, second, and third mobile devices STA1, STA2, and STA3.

To check states of the channels, the access point AP may communicate with the first mobile device STA1, the second mobile device STA2, and the third mobile device STA3 periodically (e.g., based on a preset time interval). The operation in which the access point AP communicates with the first mobile device STA1, the second mobile device STA2, and the third mobile device STA3 and checks the states of the channels may be a sounding operation. The access point AP may apply information of the channels obtained through the sounding operation to the beamforming.

Figure 2:
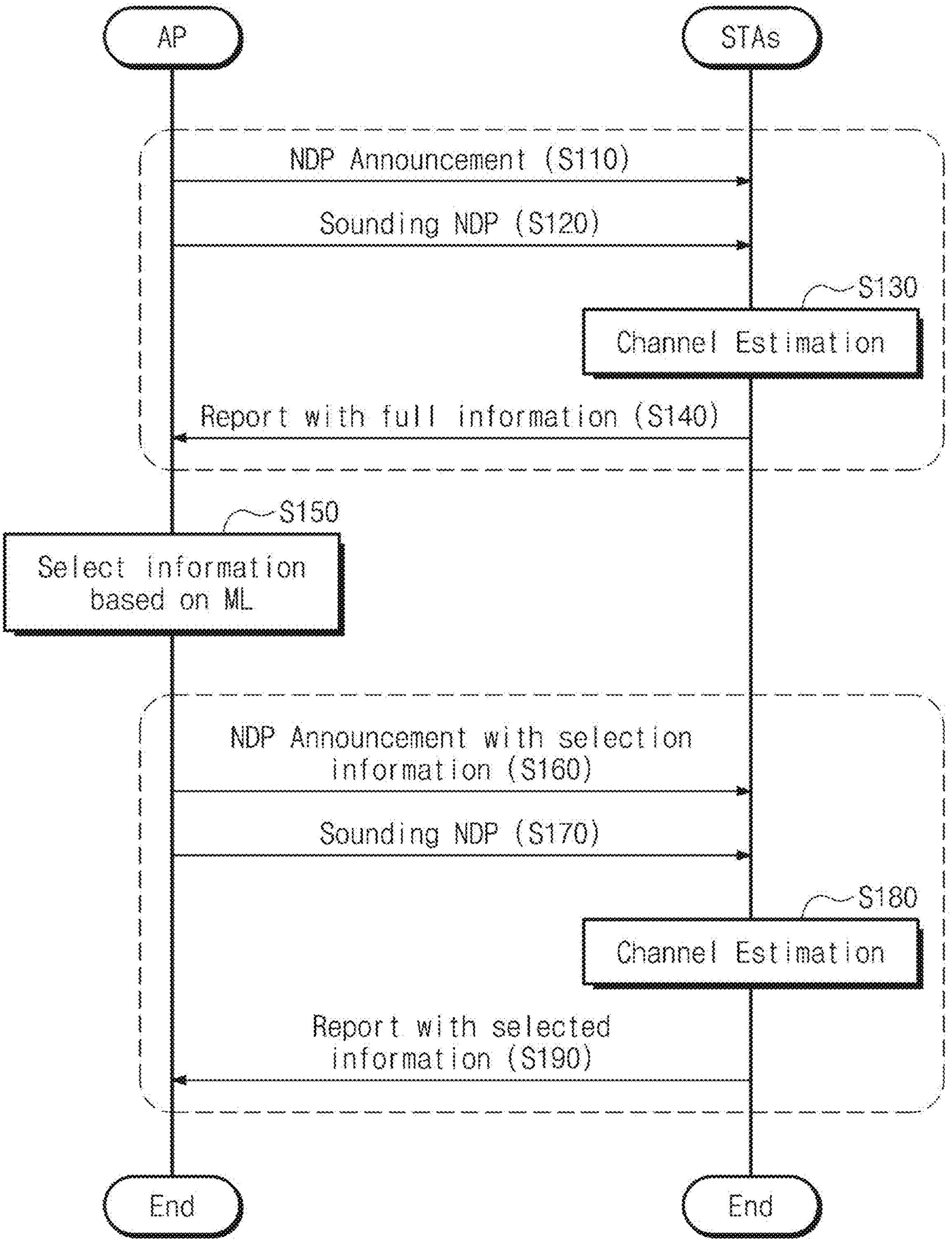
FIG. 2 is a diagram illustrating an example of a process in which an access point and mobile devices perform a sounding operation.

FIG. 2 illustrates an example of a process in which the access point AP and mobile devices STAs performs the sounding operation. For example, the mobile devices STAs may include the first mobile device STA1, the second mobile device STA2, and the third mobile device STA3.

Referring to FIGS. 1 and 2, in operation S110, the access point AP may announce a non-data packet (NDP) to the mobile devices STAs. The non-data packet may include data, which are not data intended to be exchanged with an external network as the mobile devices STAs communicate with the access point AP, for example, data necessary for the sounding operation.

For example, the announced packet may be an announcement packet. The access point AP may send the announcement packet to all the mobile devices STAs under communication. Each of the mobile devices STAs which is communicating with the access point AP may receive the announcement packet from the access point AP. The announcement packet may notify the start of the sounding operation to the mobile devices STAs. The announcement packet may be an extremely high throughput (EHT) announcement packet which is implemented based on the IEEE 802.11be, but is not limited thereto.

In operation S120, the access point AP may transmit a sounding NDP to the mobile devices STAs. The sounding NDP may include data necessary for the sounding operation, for example, data for checking states of channels between the access point AP and the mobile devices STAs. The sounding NDP may be the EHT sounding NDP which is implemented based on the IEEE 802.11be.

In operation S130, the mobile devices STAs may perform channel estimation. For example, as the sounding NDP is received, each of the mobile devices STAs may estimate features of a channel based on features of the received sounding NDP. The estimate features of the channel may be information of a result of the channel estimation.

In operation S140, the mobile devices STAs may transmit a report to the access point AP together with full information. The full information may correspond to the whole of the information of the channel estimation result. The report may be an EHT compressed beamforming report (CBR) which is implemented based on the IEEE 802.11be.

The access point AP and the mobile devices STAs may repeatedly perform operation S110, operation S120, operation S130, and operation S140. For example, during a preset time interval, the access point AP and the mobile devices STAs may periodically repeat operation S110, operation S120, operation S130, and operation S140 based on a preset period. As operation S110, operation S120, operation S130, and operation S140 are repeatedly performed, the access point AP may collect pieces of full information about the channel estimation result.

Figure 6:
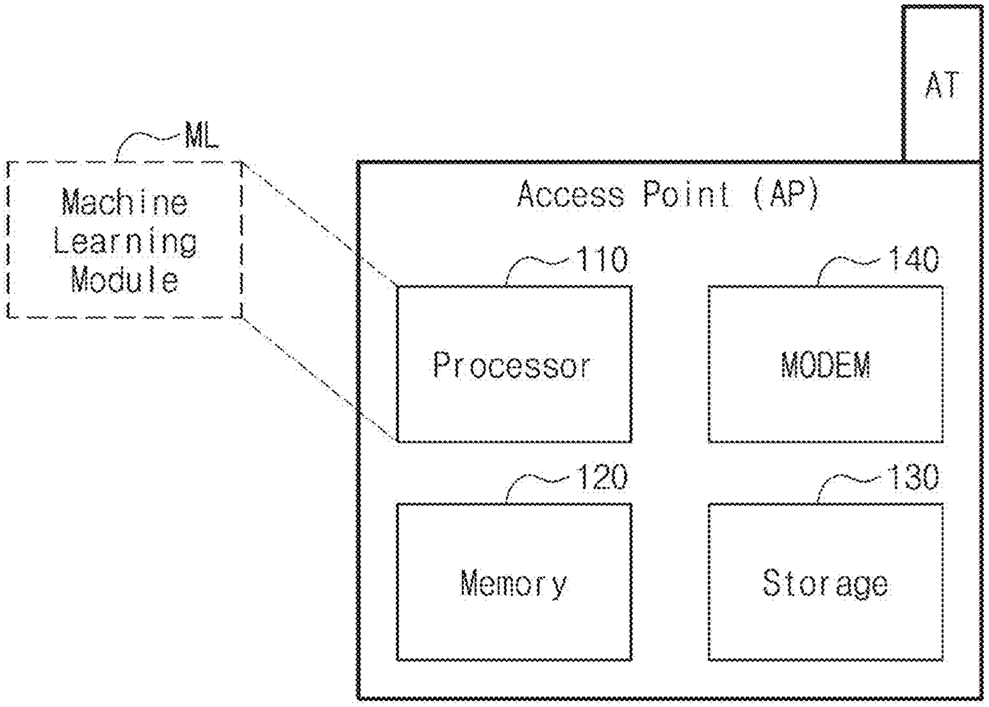
FIG. 6 is a diagram illustrating an example of an access point.

In operation S150, the access point AP may select information based on a machine learning module ML (refer to FIG. 6). For example, the access point AP may select a portion (or the whole) of the full information of the channel estimation result. For example, the access point AP may select the partial information (or the full information) by executing the machine learning module ML based on pieces of full information about the channel estimation result collected by repeatedly performing operation S110, operation S120, operation S130, and operation S140.

In operation S160, the access point AP may announce (e.g., send) the non-data packet NDP, e.g., the announcement packet together with, or including, selection information. The selection information may include information about a kind of the partial information (or the full information) selected in operation S150. For example, the selection information may be included in the announcement packet in the form of a value or a bitmap. The announcement packet in operation S160 may be the same as the announcement packet in operation S110 except that the selection information is further included.

In operation S170, the access point AP may transmit the sounding NDP to the mobile devices STAs. The sounding NDP in operation S170 may be the same as the sounding NDP in operation S120. In some implementations, the sounding NDP in operation S170 only includes data necessary for the selected partial information (or full information) compared to the sounding NDP in operation S120.

In operation S180, the mobile devices STAs may perform channel estimation. The channel estimation in operation S180 may be performed in the same manner as the channel estimation in operation S130. In some implementations, compared to the channel estimation in operation S130, the channel estimation in operation S180 may be performed only in association with, or using, the selected partial information (or full information).

In operation S190, the mobile devices STAs may transmit a report to the access point AP together with the selected information. Compared to the report in operation S140, the report in operation S190 may include the partial information corresponding to the selection information from among the full information about the channel estimation result (or the full information about the channel estimation result), instead of only the full information about the channel estimation result. In some implementations, compared to the report in operation S140, the report in operation S190 includes information indicating the selected information in the form of a value or a bitmap. In some implementations, compared to the report in operation S190, the report in operation S140 includes information indicating the full information in the form of a default value or a default bitmap.

In operation S160, operation S170, operation S180, and operation S190, the mobile devices STAs may transmit the report only including the selected information corresponding to the selection information to the access point AP. Accordingly, a time taken for the mobile devices STAs to transmit the report to the access point AP may decrease, and a time necessary for the sounding operation may decrease. Accordingly, the degree to which the communication speed between the access point AP and the mobile devices STAs decreases due to the sounding operation may decrease.

In some implementations, a kind of the selected information to be included in the report is selected by the machine learning module ML, based on training based on the full information collected by repeatedly performing operation S110, operation S120, operation S130, and operation S140. Accordingly, in some implementations, the features of the channels estimated by the access point AP are prevented from deteriorating, by collecting a portion (or the whole) of the full information in operation S160, operation S170, operation S180, and operation S190.

Figure 3:
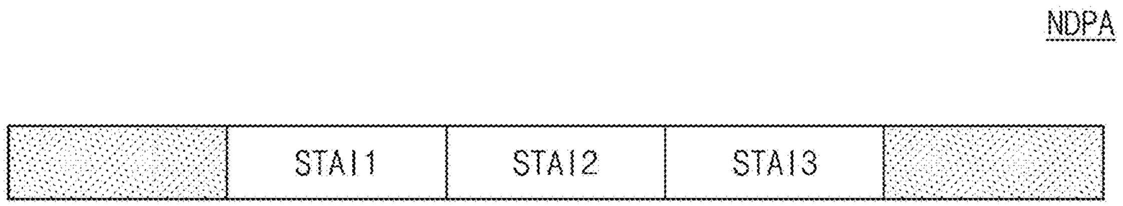
FIG. 3 illustrates an example of an announcement packet.

FIG. 3 illustrates an example of an announcement packet NDPA. Referring to FIGS. 1 and 3, the announcement packet NDPA may include a first mobile device information field STAI1, a second mobile device information field STAI2, and a third mobile device information field STAI3 respectively corresponding to the first mobile device STA1, the second mobile device STA2, and the third mobile device STA3.

The first mobile device information field STAI1, the second mobile device information field STAI2, and the third mobile device information field STAI3 may include information to be transferred to the first mobile device STA1, the second mobile device STA2, and the third mobile device STA3, respectively. For example, as described with reference to operation S160 of FIG. 2, the selection information intended to be respectively transferred to the first mobile device STA1, the second mobile device STA2, and the third mobile device STA3 may be included in the first mobile device information field STAI1, the second mobile device information field STAI2, and the third mobile device information field STAI3.

In some implementations, as the number of mobile devices STAs communicating with the access point AP increases, the number of mobile device information fields of the announcement packet NDPA increases. As the number of mobile devices STAs communicating with the access point AP decreases, the number of mobile device information fields of the announcement packet NDPA may decrease.

Figure 4:
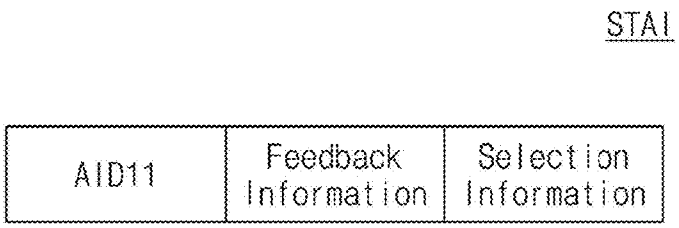
FIG. 4 illustrates an example of a mobile device information field.

FIG. 4 illustrates an example of a mobile device information field STAI. For example, the mobile device information field STAI may correspond to each of the first mobile device information field STAI1, the second mobile device information field STAI2, and the third mobile device information field STAI3.

Referring to FIGS. 1 and 4, the mobile device information field STAI may include an identifier AID11. The identifier AID11 may be used to identify a relevant mobile device among the first mobile device STA1, the second mobile device STA2, and the third mobile device STA3.

The first mobile device STA1, the second mobile device STA2, and the third mobile device STA3 may respectively receive the first mobile device information field STAI1, the second mobile device information field STAI2, and the third mobile device information field STAI3. Each of the first mobile device STA1, the second mobile device STA2, and the third mobile device STA3 may obtain the mobile device information field STAI including a relevant identifier from among the first mobile device information field STAI1, the second mobile device information field STAI2, and the third mobile device information field STAI3.

Feedback information may indicate information which each of the first mobile device STA1, the second mobile device STA2, and the third mobile device STA3 should report. For example, the features of the channels of the first mobile device STA1, the second mobile device STA2, and the third mobile device STA3, which are established by the beams BM, may be different. For example, the access point AP may differently set the number of sub-carriers to be allocated for each beam BM. For example, the number of sub-carriers may be differently allocated for each of channels through which the access point AP communicates with the first mobile device STA1, the second mobile device STA2, and the third mobile device STA3.

When the number of sub-carriers is differently allocated for each of channels through which the access point AP communicates with the first mobile device STA1, the second mobile device STA2, and the third mobile device STA3, pieces of information which the first mobile device STA1, the second mobile device STA2, and the third mobile device STA3 should report to the access point AP may be different. The feedback information may specify the amount, a format, etc., of information which the first mobile device STA1, the second mobile device STA2, and the third mobile device STA3 should report to the access point AP.

Selection information may be the selection information described with reference to FIG. 2. For example, the selection information may include information about a kind of the partial information (or the full information) selected in operation S150 of FIG. 2.

In some implementations, each of the first mobile device STA1, the second mobile device STA2, and the third mobile device STA3 performs channel estimation based on the feedback information and may report the partial information (or the full information) to the access point AP based on the selection information of result information of the channel estimation, the result information being results of the channel estimation.

As another example, each of the first mobile device STA1, the second mobile device STA2, and the third mobile device STA3 may select a partial target (or the entire target), on which the channel estimation is to be performed, based on the selection information, may perform the channel estimation based on the feedback information, and may report the entire result information of the channel estimation to the access point AP.

Figure 5:
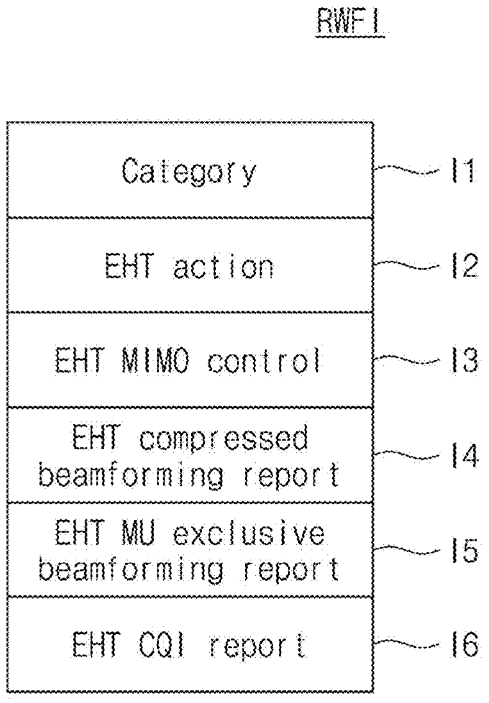
FIG. 5 illustrates an example of a frame of a report including full information.

FIG. 5 illustrates an example of a frame of a report RWFI including the full information. Referring to FIGS. 1 and 5, the report RWFI including the full information may include first information I1, second information I2, third information I3, fourth information I4, fifth information I5, and sixth information I6.

The first information I1 may include a category. The category may include a value indicating a format of the report RWFI. For example, the value of the category may indicate whether the frame of the report RWFI including the full information is an EHT frame or a protected EHT frame.

The second information I2 may include an EHT action field. The EHT action field may include the details of an action of the frame of the report RWFI including the full information. For example, the EHT action field may include information about whether the frame of the report RWFI including the full information is an "EHT compressed beamforming/channel quality indicator (CQI)" frame or any other type of frame.

The third information I3 may include an EHT MIMO control field. The EHT MIMO control field may include the number of columns of a beamforming feedback matrix of each of the first mobile device STA1, the second mobile device STA2, and the third mobile device STA3. The EHT MIMO control field may further include the number of rows of the beamforming feedback matrix of each of the first mobile device STA1, the second mobile device STA2, and the third mobile device STA3.

The EHT MIMO control field may further include information about the bandwidth of the sounding NDP, information about a unit of grouping sub-carriers, and/or information about an available bandwidth for each of the first mobile device STA1, the second mobile device STA2, and the third mobile device STA3.

The fourth information I4 may include an EHT compressed beamforming report field. The EHT compressed beamforming report field may include an average signal-to-noise ratio (SNR) of the sub-carriers, which are allocated to each of the first mobile device STA1, the second mobile device STA2, and the third mobile device STA3, over time. For example, the EHT compressed beamforming report field may include an average SNR of all the sub-carriers in each of one or more time intervals (e.g., space-time streams) obtained by partitioning a preset time window. For example, the time window may be a moving time window which includes a current time, includes a time interval from a past time, which precedes the current time as much as a preset time interval, to the current time, and moves together as the current time moves.

The EHT compressed beamforming report field may include a beamforming feedback matrix for each sub-carrier allocated to each of the first mobile device STA1, the second mobile device STA2, and the third mobile device STA3, for example, may include a compressed beamforming feedback matrix. For example, the compressed beamforming feedback matrix may include at least one first angle information (e.g., φ) and at least one second angle information (e.g., ψ). The number of first angle information (e.g., φ) for each sub-carrier and the number of second angle information (e.g., ψ) for each sub-carrier, which each of the first mobile device STA1, the second mobile device STA2, and the third mobile device STA3 should report, may be defined in the feedback information field of the mobile device information field STAI.

The fifth information I5 may include an EHT multiple user (MU) exclusive beamforming report field. The EHT MU exclusive beamforming report field may include delta SNRs. The delta SNRs may include differences between the average SNR of the fourth information I4 and the SNRs of the groups of sub-carriers in the respective space-time streams of the time window.

The sixth information I6 may include an EHT CQI report field. The EHT CQI report field may include information about the quality of a link. For example, the sixth information I6 may include an average SNR for each group of sub-carriers allocated to each of the first mobile device STA1, the second mobile device STA2, and the third mobile device STA3, for example, an average SNR for each space-time stream.

In some implementations, the bitmap of the selection information may be represented by Table 1 below.

TABLE 1

| First bit Average SNR | Second bit ψ | Third bit φ | Fourth bit Delta SNR | Fifth bit CQI |
|---|---|---|---|---|
| Bit value | Bit value | Bit value | Bit value | Bit value |

Each of the first mobile device STA1, the second mobile device STA2, and the third mobile device STA3 may only report information corresponding to a value of a specific bit among a first bit, a second bit, a third bit, a fourth bit, and a fifth bit to the access point AP.

FIG. 6 illustrates an example of the access point AP. Referring to FIGS. 1 and 6, the access point AP may include a processor 110, a memory 120, a storage 130, a modem 140, and the antenna AT.

The processor 110 may include at least one general-purpose processor such as a central processing unit (CPU) or an application processor. Also, the processor 110 may further include at least one special-purpose processor such as a neural processing unit (NPU), a neuromorphic processor (NP), or a graphics processing unit (GPU). The processor 110 may include two or more homogeneous processors.

The processor 110 may be configured to train the machine learning module ML and/or to execute the trained machine learning module ML. For example, the machine learning module ML may be implemented in the form of instructions (or codes) which are executed by the processor 110. In this case, the processor 110 may load the instructions (or codes) of the machine learning module ML to the memory 120.

As another example, the processor 110 may be manufactured to implement the machine learning module ML. For example, the processor 110 may be a dedicated processor which is implemented in the form of hardware based on the machine learning module ML generated by the learning.

As another example, the processor 110 may be manufactured to implement various machine learning or deep learning modules. The processor 110 may implement the machine learning module ML by receiving information (e.g., instructions or codes) corresponding to the machine learning module ML.

The memory 120 may be used as a working memory of the processor 110 and may be used as a main memory or a system memory of the access point AP. The memory 120 may include a volatile memory such as a dynamic random access memory or a static random access memory, or a nonvolatile memory such as a phase-change random access memory, a ferroelectric random access memory, a magnetic random access memory, or a resistive random access memory.

The storage 130 may include a stationary storage device such as a hard disk drive or a solid state drive, or a removable storage device such as an external hard disk drive, an external solid state drive, or a removable memory card. The storage 130 may store the original of the instructions (or codes) of the machine learning module ML. The instructions (or codes) of the machine learning module ML stored in the storage 130 may be loaded to the memory 120 or the processor 110.

The modem 140 may provide remote communication with an external device, such as the first mobile device STA1, the second mobile device STA2, and the third mobile device STA3, through the antenna AT. For example, the modem 140 may communicate with the first mobile device STA1, the second mobile device STA2, and the third mobile device STA3 based on the IEEE 802.11be.

The antenna AT may include the MIMO. The modem 140 may perform beamforming by using the antenna AT. The modem 140 may communicate with the first mobile device STA1, the second mobile device STA2, and the third mobile device STA3 by forming the beams BM.

As described with reference to FIGS. 1 and 2, the machine learning module ML may be trained to select partial information (or the full information) based on the whole of the result information of the channel estimation collected during the preset time interval. Also, the machine learning module ML may select partial information (or the full information) based on the whole of the result information of the channel estimation collected during the preset time interval.

Figure 7:
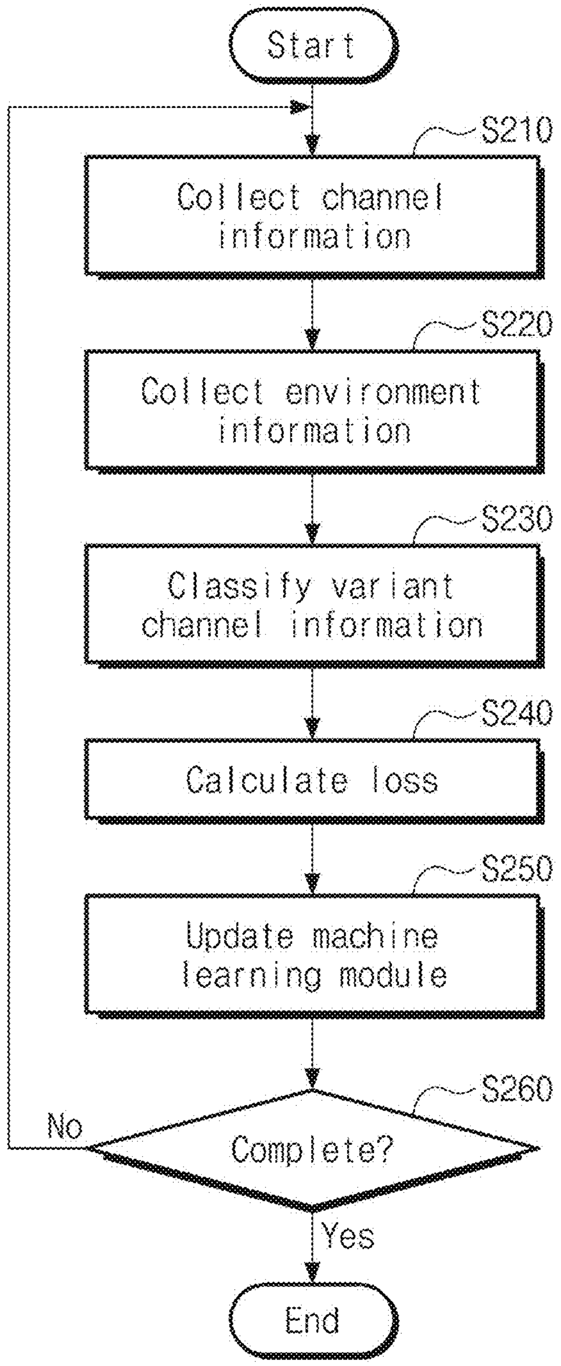
FIG. 7 is a diagram illustrating an example of a process of training a machine learning module.

FIG. 7 illustrates an example of a process of training the machine learning module ML. In some implementations, the training of the machine learning module ML is performed on the access point AP, based on information which the access point AP collects. As another example, the training of the machine learning module ML may be performed on a separate computing device independent of the access point AP, based on information collected by the access point AP.

Referring to FIGS. 1, 6, and 7, in operation S210, the access point AP may collect channel information. In some implementations, the collected channel information includes the report RWFI including the full information.

In operation S220, the access point AP may collect environment information. In some implementations, the environment information includes information about an environment to which the access point AP belongs or in which the access point AP is arranged, and the information about the environment may be distinguished from the channel information.

In some implementations, operation S210 and operation S220 are performed during a preset time interval (e.g., during an information collection interval). In some implementations, operation S210 and operation S220 include pre-processing the collected information. The pre-processing of the collected information may be performed based on Equation 1 below.

[Equation 1]

$$PIF1 = \frac{1}{Na/2}\sum_{i=0}^{(Na/2)-1}\left[\frac{1}{N}\sum_{n=0}^{N-1}\left(IF1i(n)^2 - \left(\frac{1}{N}\sum_{n=0}^{N-1} IF1i(n)\right)\right)^2\right]$$

In Equation 1 above, "Na" indicates the number of information included in the report RWFI including the full information (e.g., number of elements of information, number of pieces of information, or number of types of information); "N" may indicates the number of reports RWFI including the full information; "IF1" indicates channel information or environment information and may include, for example, the first angle φ or the second angle ψ; and "PIF1" indicates pre-processed channel information or pre-processed environment information.

As another example, the pre-processing of the collected information may be performed based on Equation 2 below.

[Equation 2]

$$PIF2 = \frac{1}{Nc}\sum_{i=0}^{(Nc/2)-1}\left[\frac{1}{N}\sum_{n=0}^{N-1}\left(IF1i(n)^2 - \left(\frac{1}{N}\sum_{n=0}^{N-1} IF2i(n)\right)\right)^2\right]$$

In Equation 2 above, "Nc" indicates the number of information included in the report RWFI including the full information (e.g., number of elements of information, number of pieces of information, or number of types of information); "N" indicates the number of reports RWFI including the full information; "IF2" indicates channel information or environment information and may include, for example, an average signal-to-noise ratio (SNR); and "PIF2" indicates pre-processed channel information or pre-processed environment information.

In operation S230, in some implementations, the access point AP or any other computing device may classify variant channel information by using the machine learning module ML. For example, the access point AP or any other computing device may classify (or infer) the variant channel information among pieces of channel information capable of being selected by the selection information, by executing the machine learning module ML based on the collected channel information and environment information.

In operation S230, in some implementations, the access point AP or any other computing device may predict the variant channel information, which is regarded as becoming variant later, from among the pieces of channel information capable of being selected by the selection information, by executing the machine learning module ML based on the collected channel information and environment information.

In operation S240, the access point AP or any other computing device may calculate a loss. For example, when each of the pieces of classified (or inferred) variant channel information is actually variant, the access point AP or any other computing device may decrease the loss. When each of the pieces of classified (or inferred) variant channel information is not actually variant, the access point AP or any other computing device may increase the loss.

As another example, when each of the pieces of predicted variant channel information becomes actually variant later, the access point AP or any other computing device may decrease the loss. When each of the pieces of predicted variant channel information does not become actually variant later, the access point AP or any other computing device may increase the loss. In some implementations, because the machine learning module ML is trained by using the channel information and the environment information previously collected by the access point AP, whether specific channel information becomes variant later may be identified based on the previously collected channel information.

In operation S250, the access point AP or any other computing device may update the machine learning module ML based on the loss. For example, the access point AP or any other computing device may update weights of the machine learning module ML such that the loss decreases.

In operation S260, the access point AP or any other computing device may determine whether the learning is completed. For example, the learning may be completed when the learning is iteratively performed during the preset time interval or as much as the preset number of times. In some implementations, the learning is completed in response to the loss being smaller than a threshold value.

When the learning is completed, the training of the machine learning module ML may end. When the learning is not completed, the learning may be again performed from operation S210.

FIG. 8 illustrates an example of channel information, environment information, and selection information. Referring to FIGS. 1 and 8, channel information may include the first information I1, the second information I2, the third information I3, the fourth information I4, the fifth information I5, and the sixth information I6.

The environment information may include the number of multiple users (MU) and the number of MIMO antennas of the access point AP of the access point AP.

The environment information may include the intensity of interference. For example, when the access point AP, the first mobile device STA1, the second mobile device STA2, and the third mobile device STA3 are located in a closed space, the intensity of interference due to the reflection or scattering of wireless frequencies may increase. When the access point AP, the first mobile device STA1, the second mobile device STA2, and the third mobile device STA3 are located in an open space, the intensity of interference due to the reflection or scattering of wireless frequencies may decrease.

The environment information may include a movement speed. For example, as a relative movement speed between the access point AP and the first mobile device STA1, the second mobile device STA2, and the third mobile device STA3 becomes higher, the quality of links may be reduced. As a relative movement speed between the access point AP and the first mobile device STA1, the second mobile device STA2, and the third mobile device STA3 becomes slower, the quality of links may be improved.

The selection information may be used to select a portion (or the whole) of the channel information including the first information I1, the second information I2, the third information I3, the fourth information I4, the fifth information I5, and the sixth information I6. In some implementations, the first information I1, the second information I2, and the third information I3 may be always selected, but implementations are not limited thereto. The selection information of FIG. 8 shows examples of the channel information, which is additionally selected, in addition to the first information I1, the second information I2, and the third information I3.

As a first example, the selection information may include the fourth information I4. In the first example, each of the first mobile device STA1, the second mobile device STA2, and the third mobile device STA3 may transmit, to the access point AP, the first information I1, the second information I2, the third information I3, and the fourth information I4 as a compressed beamforming report (CBR). The first example may be called a single user (SU) mode.

As a second example, the selection information may include the fourth information I4 and the fifth information I5. In the second example, each of the first mobile device STA1, the second mobile device STA2, and the third mobile device STA3 may transmit, to the access point AP, the first information I1, the second information I2, the third information I3, the fourth information I4, and the fifth information I5 as the CBR. The second example may be called a multiple user (MU) mode.

As a third example, the selection information may include an SNR. In the third example, each of the first mobile device STA1, the second mobile device STA2, and the third mobile device STA3 may transmit, to the access point AP, the first information I1, the second information I2, the third information I3, and an average SNR of sub-carriers for each space-time stream in the fourth information I4 as the CBR. The third example may be called an SNR-only mode.

As a fourth example, the selection information may include a CQI. In the fourth example, each of the first mobile device STA1, the second mobile device STA2, and the third mobile device STA3 may transmit, to the access point AP, the first information I1, the second information I2, the third information I3, and the sixth information I6 as the CBR. The fourth example may be called a CQI-only mode.

As a fifth example, the selection information may include the first angle φ. In the fifth example, each of the first mobile device STA1, the second mobile device STA2, and the third mobile device STA3 may transmit, to the access point AP, the first information I1, the second information I2, the third information I3, information of the first angle φ of a compressed beamforming feedback matrix for each sub-carrier in the fourth information I4 as the CBR. The fifth example may be called a φ-only mode.

As a sixth example, the selection information may include the first angle φ and the second angle ψ. In the sixth example, each of the first mobile device STA1, the second mobile device STA2, and the third mobile device STA3 may transmit, to the access point AP, the first information I1, the second information I2, the third information I3, and information of the first angle φ and the second angle ψ of the compressed beamforming feedback matrix for each sub-carrier in the fourth information I4 as the CBR.

As a seventh example, the selection information may include no sounding. In the seventh example, after transmitting the announcement packet including the selection information of the no sounding, the access point AP may not transmit the sounding NDP. During a time determined in association with the no sounding, the access point AP may not perform the sounding operation. When the announcement packet including the selection information of the no sounding is received, each of the first mobile device STA1, the second mobile device STA2, and the third mobile device STA3 may identify that the sounding NDP is not received.

As an eighth example, the selection information may include full information. In the eighth example, each of the first mobile device STA1, the second mobile device STA2, and the third mobile device STA3 may transmit, to the access point AP, the first information I1, the second information I2, the third information I3, the fourth information I4, the fifth information I5, and the sixth information I6 as the CBR.

Figure 9:
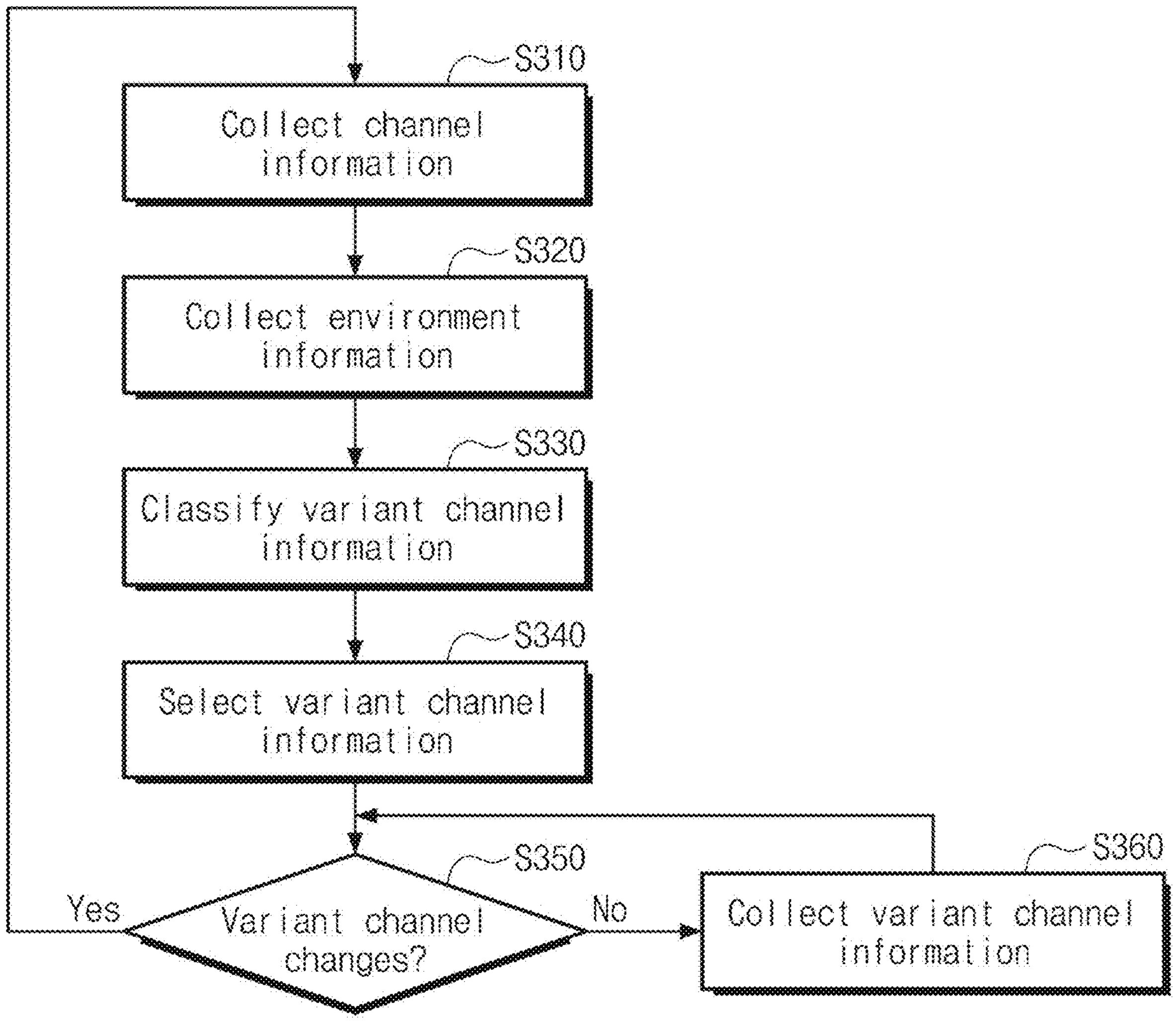
FIG. 9 is a diagram illustrating an example of a process in which an access point selects channel information.

FIG. 9 illustrates an example of a process in which the access point AP selects channel information by using the machine learning module ML whose training is completed (a trained machine learning module ML). Referring to FIGS. 1, 6, and 9, in operation S310, the access point AP may collect channel information. In some implementations, the collected channel information includes the report RWFI including the full information.

In operation S320, the access point AP may collect environment information. In some implementations, the environment information includes information about an environment to which the access point AP belongs, and the information about the environment may be distinguished from the channel information. Non-limiting examples of the environment information are provided above in reference to FIG. 8.

In some implementations, operation S310 and operation S320 are performed during a preset time interval (e.g., during an information collection interval).

In operation S330, in some implementations, the access point AP or any other computing device classifies variant channel information by using the machine learning module ML. For example, the access point AP or any other computing device may classify (or infer) the variant channel information among pieces of channel information capable of being selected by the selection information, by executing the machine learning module ML based on the collected channel information and environment information.

In operation S330, in some implementations, the access point AP or any other computing device predicts the variant channel information, which is regarded as becoming variant later, from among the pieces of channel information capable of being selected by the selection information, by executing the machine learning module ML based on the collected channel information and environment information.

In operation S340, the access point AP may select variant channel information. For example, the access point AP may select channel information which is currently variant or channel information which is regarded as becoming variant later, for each of the first mobile device STA1, the second mobile device STA2, and the third mobile device STA3. In some implementations, the access point AP selects different selection information for the first mobile device STA1, the second mobile device STA2, and the third mobile device STA3.

The access point AP may transmit the selection information including the announcement packet to the first mobile device STA1, the second mobile device STA2, and the third mobile device STA3. Each of the first mobile device STA1, the second mobile device STA2, and the third mobile device STA3 may transmit information corresponding to the selection information from among pieces of channel information to the access point AP, e.g., may only transmit, from among the available pieces of channel information, the information corresponding to the selection information, without transmitting other available pieces of channel information.

In operation S350, the access point AP may determine whether a variant channel changes. In some implementations, the machine learning module ML is trained to classify (or infer) or predict whether variant channels corresponding to the selection information are variant, based on the pieces of information corresponding to the selection information. In some implementations, when at least one of the pieces of information received from the first mobile device STA1, the second mobile device STA2, and the third mobile device STA3 is determined as being not variant, the access point AP determines that the variant channel changes. In some implementations, when an average or an intermediate value of the variant channel information changes as much as a threshold value or more, the access point AP determines that the variant channel changes.

When the variant channel does not change, in operation S360, the access point AP may collect the variant channel information by performing the sounding operation while maintaining the selection information, e.g., the previously-determined selection information. Until the variant channel changes, the access point AP may only collect the variant channel information (in operation S360) and may monitor the variant channel information (in operation S350). When the variant channel changes, the access point AP may again perform the collection of the full information from operation S310.

Figure 10:
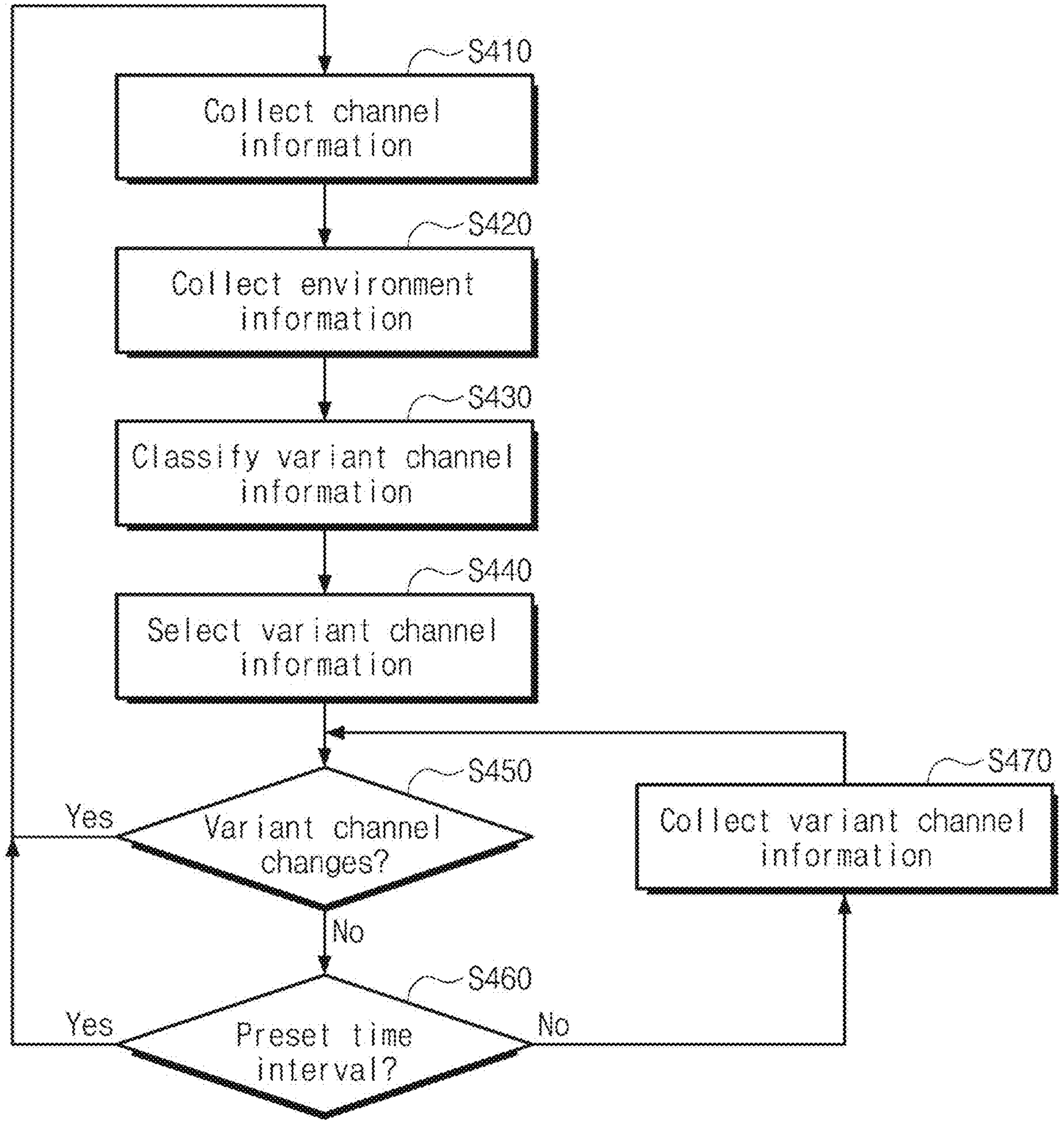
FIG. 10 is a diagram illustrating an example of a process in which an access point selects channel information.

FIG. 10 illustrates another example of a process in which the access point AP selects channel information by using the trained machine learning module ML. Referring to FIGS. 1, 6, and 10, in operation S410, the access point AP may collect channel information. In operation S420, the access point AP may collect environment information. In some implementations, operation S410 and operation S420 are performed during a preset time interval (e.g., during an information collection interval).

In operation S430, the access point AP or any other computing device may classify variant channel information by using the machine learning module ML. In operation S440, the access point AP may select variant channel information. Operation S410, operation S420, operation S430, and operation S440 are performed as described for operation S310, operation S320, operation S330, and operation S340 of FIG. 9. Thus, additional description will be omitted to avoid redundancy.

In operation S450, the access point AP may determine whether a variant channel changes. In some implementations, the machine learning module ML is trained to classify (or infer) or predict whether variant channels corresponding to the selection information are variant, based on the pieces of information corresponding to the selection information. In some implementations, when at least one of pieces of information received from the first mobile device STA1, the second mobile device STA2, and the third mobile device STA3 is determined as being not variant, the access point AP determines that the variant channel changes. In some implementations, when an average or an intermediate value of the variant channel information changes as much as the threshold value or more, the access point AP determines that the variant channel changes.

When the variant channel does not change, in operation S460, the access point AP may determine whether a preset time interval passes. For example, the preset time interval may be a time during which to collect only a portion of channel information by using the selection information is permitted.

When the variant channel does not change and when the preset time interval does not pass, in operation S470, the access point AP may collect the variant channel information by performing the sounding operation while maintaining the selection information. Until the variant channel changes or until the preset time interval passes, the access point AP may only collect the variant channel information (in operation S470), may monitor the variant channel information (in operation S450), and may determine whether the preset time interval passes (in operation S460).

When the variant channel changes or when a preset time passes from a point in time at which the sounding operation starts by using the selection information (e.g., even if the variant channel has not changed), the access point AP may again perform the collection of full information from operation S410.

Figure 11:
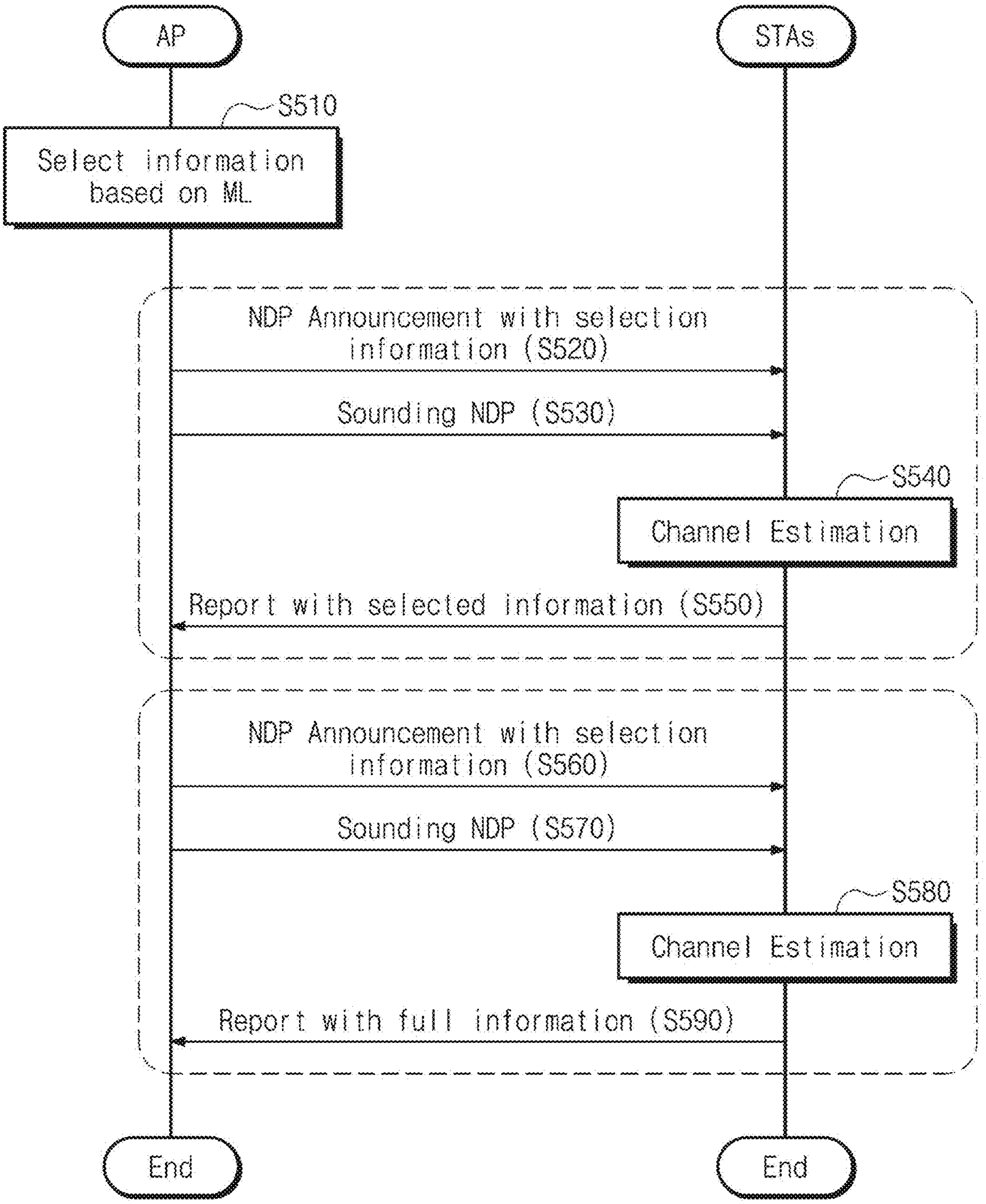
FIG. 11 is a diagram illustrating an example of a process in which an access point and mobile devices perform a sounding operation.

FIG. 11 illustrates another example of a process in which the access point AP and the mobile devices STAs perform the sounding operation. For example, the mobile devices STAs may include the first mobile device STA1, the second mobile device STA2, and the third mobile device STA3.

Referring to FIGS. 1 and 11, in operation S510, the access point AP may select information based on the machine learning module ML. For example, the access point AP may select a portion (or the whole) of full information of a channel estimation result. Operation S510 may be performed as described for operation S150 of FIG. 2. Thus, additional description will be omitted to avoid redundancy.

In operation S520, the access point AP may announce the non-data packet NDP, e.g., the announcement packet together with selection information. In operation S530, the access point AP may transmit the sounding NDP to the mobile devices STAs. Operation S520 and operation S530 may be performed as described for operation S160 and operation S170 of FIG. 2. Thus, additional description will be omitted to avoid redundancy.

In operation S540, the mobile devices STAs may perform channel estimation. In some implementations, operation S540 is performed as described for operation S180 of FIG. 2. In some implementations, the mobile devices STAs perform the channel estimation for the full information regardless of the selection information.

In operation S550, the mobile devices STAs may transmit a report to the access point AP together with the selected information. In some implementations, operation S550 is performed as described for operation S190 of FIG. 2. Thus, additional description will be omitted to avoid redundancy.

In operation S560, the access point AP may announce the non-data packet NDP, e.g., the announcement packet together with selection information. In operation S570, the access point AP may transmit the sounding NDP to the mobile devices STAs. In operation S580, the mobile devices STAs may perform channel estimation. Operation S560, operation S570, and operation S580 may performed as described for operation S520, operation S530, and operation S540.

In some implementations, even when the announcement packet is received together with the selection information (e.g., indicating less than the full information), the mobile devices STAs may perform the channel estimation for the full information. For example, when the quality of a portion of the full information (e.g., a selected portion) is low, even though the announcement packet is received together with the selection information, the mobile devices STAs may transmit the report to the access point AP together with the full information.

For example, the mobile devices STAs may include, implement, or execute the machine learning module ML. The mobile devices STAs may classify (or infer) or predict a variant channel by executing the machine learning module ML based on the full information. When information of the variant channel classified (or inferred) or predicted by the mobile devices STAs is not included in the selection information, the mobile devices STAs may transmit the report including the full information to the access point AP.

When the report is received together with the full information in operation S590 (e.g., even though the announcement packet was transmitted together with the selection information in operation S560), the access point AP may collect pieces of full information about the channel estimation result by again repeatedly performing operation S110, operation S120, operation S130, and operation S140 described with reference to FIG. 2.

Figure 12:
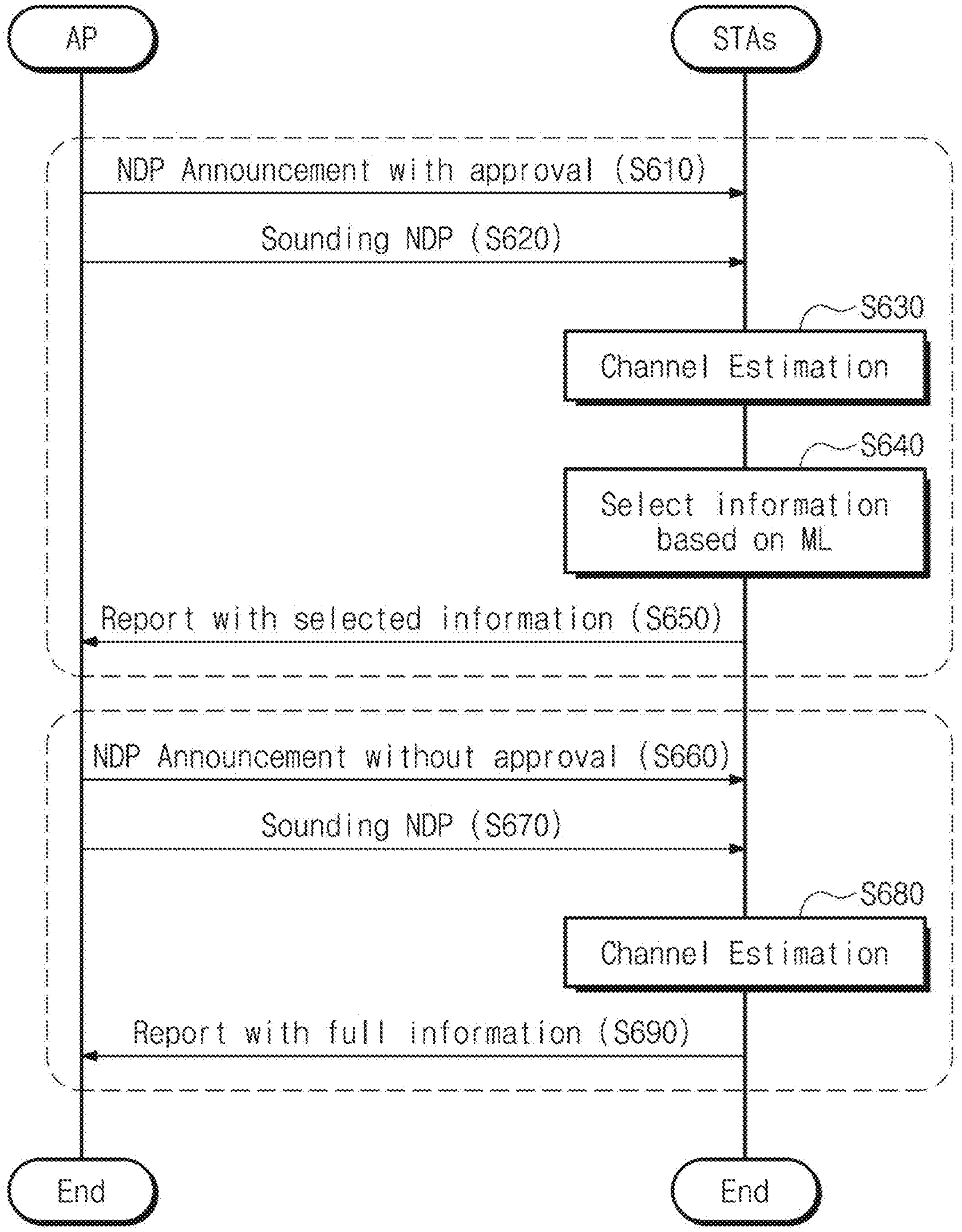
FIG. 12 is a diagram illustrating an example of a process in which an access point and mobile devices perform a sounding operation.

FIG. 12 illustrates another example of a process in which the access point AP and the mobile devices STAs perform the sounding operation. For example, the mobile devices STAs may include the first mobile device STA1, the second mobile device STA2, and the third mobile device STA3.

In operation S610, the access point AP may announce the non-data packet NDP, that is, the announcement packet to the mobile devices STAs together with approval information. For example, the mobile devices STAs may include, implement, or execute the machine learning module ML. The approval information may approve that the mobile devices STAs execute the machine learning module ML.

In operation S620, the access point AP may transmit the sounding NDP to the mobile devices STAs. In operation S630, the mobile devices STAs may perform channel estimation.

In operation S640, the mobile devices STAs may select information based on the machine learning module ML. The mobile devices STAs may execute the machine learning module ML based on pieces of full information about a channel estimation result. In some implementations, after the full information about the channel estimation result is collected by repeatedly performing the sounding operations during a preset time, the mobile devices STAs execute the machine learning module ML. After the mobile devices STAs start to execute the machine learning module ML, the mobile devices STAs may continuously execute the machine learning module ML based on a channel estimation result collected during the most recent preset time.

The mobile devices STAs may classify (or infer) or predict variant channel information among the full information about the channel estimation result by executing the machine learning module ML. The mobile devices STAs may select the variant channel information.

In operation S650, the mobile devices STAs may transmit a report to the access point AP together with the selected information.

In operation S660, the access point AP may announce the non-data packet NDP, e.g., the announcement packet to the mobile devices STAs without the approval information. In operation S670, the access point AP may transmit the sounding NDP to the mobile devices STAs. In operation S680, the mobile devices STAs may perform channel estimation. Because there is no approval information, in operation S690, the mobile devices STAs may transmit a report to the access point AP together with the full information about the channel estimation result.

The mobile devices STAs may always execute the machine learning module ML by using the full information about the channel estimation result. Accordingly, the mobile devices STAs may classify (or infer) or predict the variant channel information more accurately. Accordingly, the quality of channels which the access point AP establishes based on the selected information may be improved.

Figure 13:
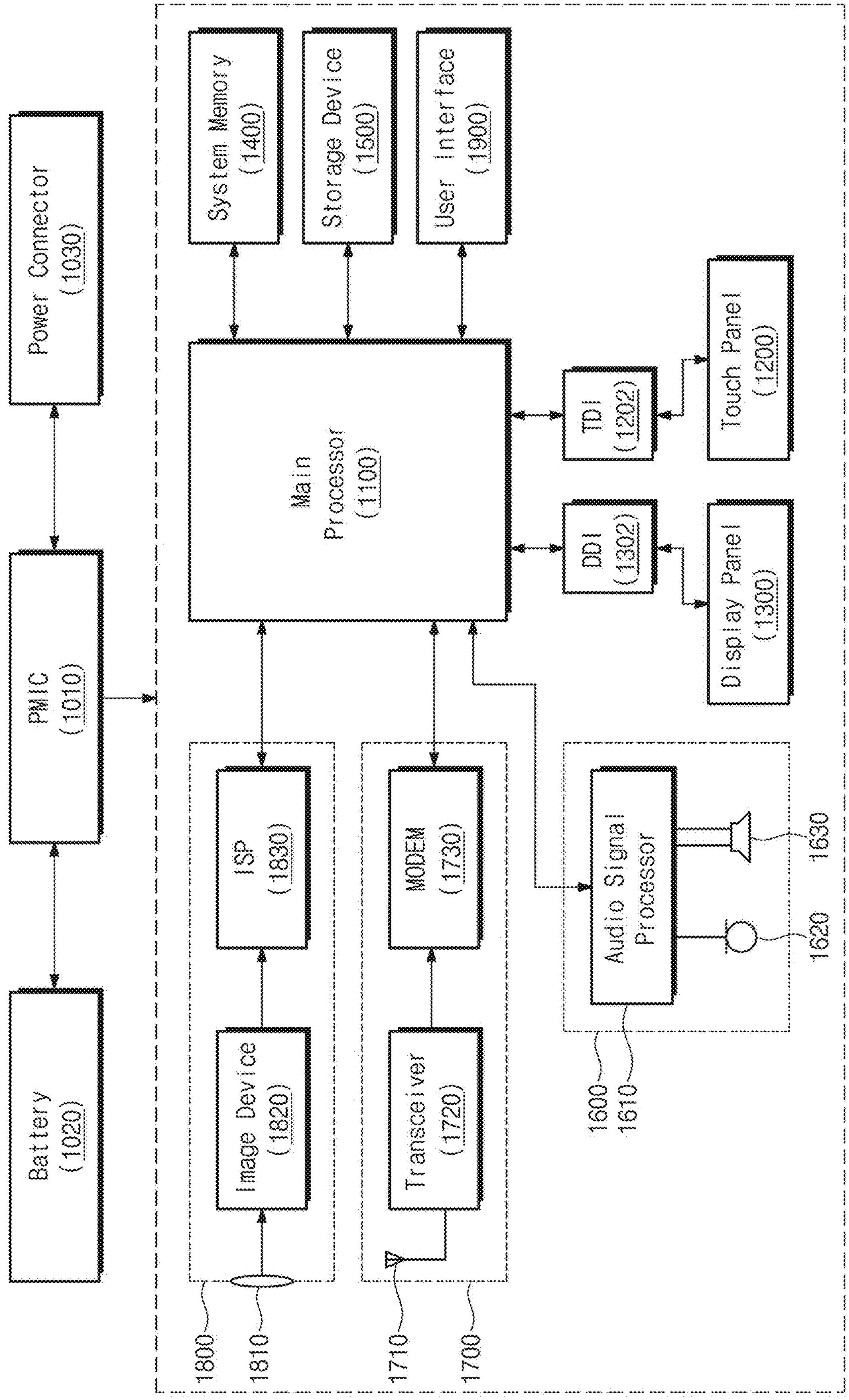
FIG. 13 is a diagram illustrating an example of a mobile device.

FIG. 13 illustrates an example of a mobile device 1000 according to some implementations of the present disclosure. For example, the mobile device 1000 may correspond to the first mobile device STA1, the second mobile device STA2, the third mobile device STA3, or the mobile devices STAs.

Referring to FIG. 13, the mobile device 1000 includes a main processor 1100, a touch panel 1200, a touch driver integrated circuit (TDI) 1202, a display panel 1300, a display driver integrated circuit (DDI) 1302, a system memory 1400, a storage device 1500, an audio processor 1600, a communication block 1700, an image processor 1800, and a user interface 1900. In some implementations, the mobile device 1000 may be one of various electronic devices such as a portable communication terminal, a personal digital assistant (PDA), a portable media player (PMP), a digital camera, a smartphone, a tablet computer, a wearable device, etc.

The main processor 1100 may control all operations of the mobile device 1000. The main processor 1100 may control/manage operations of the components of the mobile device 1000. The main processor 1100 may perform various operations to drive the mobile device 1000. The touch panel 1200 may be configured to sense a touch input from a user under control of the touch driver integrated circuit 1202. The display panel 1300 may be configured to display image information under control of the display driver integrated circuit 1302.

The system memory 1400 may store data which are used in the operation of the mobile device 1000. For example, the system memory 1400 may include a volatile memory such as a static random access memory (SRAM), a dynamic RAM (DRAM), or a synchronous DRAM (SDRAM), and/or a nonvolatile memory such as a phase change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories such as a flash memory, a PRAM, an MRAM, a ReRAM, and a FRAM. For example, the storage device 1500 may include an embedded memory and/or a removable memory of the mobile device 1000.

The audio processor 1600 may process an audio signal by using an audio signal processor 1610. The audio processor 1600 may receive an audio input through a microphone 1620 or may provide an audio output through a speaker 1630.

The communication block 1700 may exchange signals with an external device/system through an antenna 1710. A transceiver 1720 and a modulator/demodulator (MODEM) 1730 of the communication block 1700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), radio frequency identification (RFID), etc.

The image processor 1800 may receive light through a lens 1810. An image device 1820 and an image signal processor (ISP) 1830 included in the image processor 1800 may generate image information about an external object, based on received light. The user interface 1900 may include an interface capable of exchange information with a user, e.g., in addition to the touch panel 1200, the display panel 1300, the audio processor 1600, and the image processor 1800. The user interface 1900 may include a keyboard, a mouse, a printer, a projector, various sensors, a human body communication device, etc.

The mobile device 1000 may further include a power management IC (PMIC) 1010, a battery 1020, and a power connector 1030. The power management IC 1010 may generate internal power from a power supplied from the battery 1020 or a power supplied from the power connector 1030, and may provide the internal power to the main processor 1100, the touch panel 1200, the touch driver integrated circuit (TDI) 1202, the display panel 1300, the display driver integrated circuit (DDI) 1302, the system memory 1400, the storage device 1500, the audio processor 1600, the communication block 1700, the image processor 1800, and the user interface 1900.

The main processor 1100 may perform the sounding operation described with reference to FIGS. 1 to 12. For example, the main processor 1100 may perform channel estimation and may generate various reports. The main processor 1100 may be further configured to execute the machine learning module ML. The main processor 1100 may select a portion (or the whole) of full information about a result of the channel estimation, based on the machine learning module ML.

As described with reference to FIGS. 1 to 12, the communication block 1700 may exchange packets for the sounding operation with the access point AP.

In reference to the above examples, components are described by using the terms "first", "second", "third", etc. However, the terms "first", "second", "third", etc. are used to distinguish components from each other and do not limit the present disclosure. For example, the terms "first", "second", "third", etc. do not involve an order or a numerical meaning of any form.

In the above examples, components are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to some implementations of the present disclosure, a portion of full information about a result of channel estimation is selected by using a machine learning module. A mobile device may transmit the selected partial information to an access point. Accordingly, the degree to which a communication speed decreases due to the sounding operation may be reduced.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised f rom the combination, and the combination may be directed to a subcombination or variation of a subcombination.

While the present disclosure describes various examples, it will be apparent to those of ordinary skill in the art that various changes and modifications may be made thereto without departing from the spirit and scope of the present disclosure as set forth in the following claims.

What is claimed is:

1. A mobile device comprising:
an antenna configured to communicate with an access point using wireless signals;
a transceiver coupled to the antenna; and
a processor configured to:
receive a first announcement packet and a first sounding packet through the antenna and the transceiver,
perform first channel estimation based on the first sounding packet,
transmit full information about a result of the first channel estimation using the transceiver and the antenna,
receive a second announcement packet and a second sounding packet through the antenna and the transceiver,
perform second channel estimation based on the second sounding packet, and
transmit partial information, selected from full information about a result of the second channel estimation, using the transceiver and the antenna,
wherein the second announcement packet includes selection information indicating a subset of the full information about the result of the second channel estimation that is to be included in the partial information,
wherein the full information comprises N information, where N is a positive integer greater than 1,
wherein the partial information comprises M information, where M is a positive integer less than the N, and
wherein the selection information is determined using a machine learning module included in the access point.

2. The mobile device of claim 1, wherein the partial information includes information about an angle associated with beamforming by the access point.

3. The mobile device of claim 1, wherein the partial information includes information about at least two angles associated with beamforming by the access point.

4. The mobile device of claim 1, wherein the partial information includes at least one of: single user information, multiple user information, signal-to-noise ratio information, or channel quality indicator information.

5. The mobile device of claim 1, wherein the processor is configured to, based on a result of channel estimation changing, transmit full information about the result of the channel estimation through the transceiver and the antenna.

6. A mobile device comprising:
an antenna configured to communicate with an access point using wireless signals;
a transceiver coupled to the antenna; and
a processor configured to:
receive an announcement packet and a sounding packet through the antenna and the transceiver, perform first channel estimation based on the sounding packet, select partial information, from full information about a result of the first channel estimation, by executing a machine learning module based on a result of channel estimation, wherein the partial information is a subset of the full information about the result of the first channel estimation, and wherein the channel estimation is performed prior to the first channel estimation, and transmit the partial information using the transceiver and the antenna wherein the full information comprises N information, where N is a positive integer greater than 1, and wherein the partial information comprises M information, where M is a positive integer less than the N.

7. The mobile device of claim 6, wherein the processor is configured to:

during a preset time period prior to receiving the announcement packet, transmit full information about the result of the channel estimation using the transceiver and the antenna; and execute the machine learning module based on the full information about the result of the channel estimation collected during the preset time period.

8. The mobile device of claim 7, wherein the processor is configured to continuously execute the machine learning module based on the result of the channel estimation collected during the preset time period.

9. The mobile device of claim 6, wherein the processor is configured to execute the machine learning module based on approval information included in the announcement packet.

10. The mobile device of claim 9, wherein the processor is configured to, based on a second announcement packet not including the approval information, transmit full information about a result of second channel estimation using the transceiver and the antenna, without executing the machine learning module.

11. The mobile device of claim 6, wherein the processor is configured to, based on an execution result of the machine learning module indicating that full information about a result of second channel estimation is to be transmitted, select the full information about the result of second channel estimation to be transmitted using the transceiver and the antenna.

12. The mobile device of claim 6, wherein the processor is configured to:

classify a type of variant information, from full information about the result of the channel estimation, by executing the machine learning module, and select, as the partial information, the type of variant information.

13. The mobile device of claim 6, wherein the processor is configured to:

predict a type of information that is expected to be variant, from full information about the result of the channel estimation, by executing the machine learning module, and select, as the partial information, the type of information expected to be variant.

14. An electronic device comprising:

an antenna configured to communicate with a mobile device using wireless signals;

a modem coupled to the antenna; and a processor configured to:

transmit a first announcement packet and a first sounding packet using the antenna and the modem, receive a first report corresponding to the first announcement packet and the first sounding packet, select, using a machine learning module, partial information, based on full information about a result of first channel estimation included in the first report, and transmit, using the antenna and the modem, a second sounding packet and second announcement packet including selection information indicating a subset of full information about a result of second channel estimation that is to be included in the partial information, wherein the second announcement packet is configured to cause the mobile device to perform the second channel estimation, wherein the full information comprises N information, where N is a positive integer greater than 1, and wherein the partial information comprises M information, where M is a positive integer less than the N.

15. The electronic device of claim 14, wherein the processor is configured to:

collect full information about a result of channel estimation during a preset time period prior to selecting the partial information; and execute the machine learning module based on the full information about the result of the channel estimation collected during the preset time period.

16. The electronic device of claim 14, wherein the processor is configured to:

classify a type of variant information from the full information about the result of the first channel estimation, and select the type of variant information as the partial information.

17. The electronic device of claim 14, wherein the processor is configured to:

predict a type of information that is expected to be variant by executing the machine learning module, and select, as the partial information, the type of information expected to be variant.

18. The electronic device of claim 14, wherein the processor is configured to receive a second report including the partial information through the antenna and the modem after transmitting the second sounding packet and the second announcement packet.

19. The electronic device of claim 18, wherein the processor is configured to execute the machine learning module based on the partial information.

20. The electronic device of claim 14, wherein the processor is configured to transmit the first announcement packet and a third sounding packet to the mobile device at least one of (i) periodically or (ii) based on a type of the partial information selected by the machine learning module changing.

* * * * *